U S006778361B2

(12) United States Patent
Magnusson

(10) Patent No.: US 6,778,361 B2
(45) Date of Patent: Aug. 17, 2004

(54) NON-SYMMETRIC HELICAL SCANNER ARCHITECTURE FOR HIGH TRACK DENSITY

(75) Inventor: Steven L. Magnusson, Boulder, CO (US)

(73) Assignee: Exabyte Corporation, Boulder, CO (US)

( * ) Notice: Subject to any disclaimer, the term of this patent is extended or adjusted under 35 U.S.C. 154(b) by 77 days.

(21) Appl. No.: 10/004,106

(22) Filed: Dec. 6, 2001

(65) Prior Publication Data

US 2002/0071195 A1 Jun. 13, 2002

Related U.S. Application Data

(60) Provisional application No. 60/251,578, filed on Dec. 7, 2000.

(51) Int. Cl.[7] .............................. G11B 21/16; G11B 5/48
(52) U.S. Cl. ..................... 360/241.1; 360/55; 360/245.3
(58) Field of Search ........................... 360/241.1, 245.3, 360/55

(56) References Cited

U.S. PATENT DOCUMENTS

| | | | |
|---|---|---|---|
| 4,835,628 A | 5/1989 | Hinz et al. | |
| 4,843,495 A | 6/1989 | Georgis et al. | |
| 4,845,577 A | 7/1989 | Georgis et al. | |
| 4,868,692 A | 9/1989 | Nakase et al. | |
| 5,050,018 A | 9/1991 | Georgis et al. | |
| 5,065,261 A | 11/1991 | Hughes et al. | |
| 5,068,757 A | 11/1991 | Hughes et al. | |
| 5,142,422 A | 8/1992 | Zook et al. | |
| 5,181,146 A * | 1/1993 | Koga | ........................ 360/64 |
| 5,313,346 A | 5/1994 | Shimotashiro et al. | |
| 5,325,246 A | 6/1994 | Guisinger et al. | |
| 5,602,694 A | 2/1997 | Miles et al. | |
| 5,680,269 A | 10/1997 | Georgis et al. | |
| 5,726,826 A | 3/1998 | Miles et al. | |
| 5,966,497 A * | 10/1999 | Hara | ........................... 360/70 |
| 6,304,410 B1 * | 10/2001 | Kita et al. | ..................... 360/84 |

OTHER PUBLICATIONS

Kanota et al, "A High Density Recording Technology for Digital VCRS", IEEE Transactions on Consumer Electronics, vol. 36, No. 3, Aug. 1990, pp. 540–547.

U.S. patent application Ser. No. 09/761,658, filed Jan. 18, 2001, entitled "Phase Based Time Domain Tracking For Helical Scan Tape Drive".

U.S. patent application Ser. No. 09/492,345, filed Jan. 27, 2000, entitled "Power Supply Circuit and Method of Calibration Therefor".

* cited by examiner

*Primary Examiner*—David Hudspeth
*Assistant Examiner*—Rocio Colon
(74) *Attorney, Agent, or Firm*—Nixon & Vanderhye, P.C.

(57) ABSTRACT

A scanner (3–85, 8–85, 9–85) for use in a helical scan magnetic transducing apparatus has a periphery upon which plural read tranducing elements (3–82) and plural write transducing elements (3–80) are mounted non-symmetrically. The plural write transducing elements are physically situated on the periphery of the scanner in M number of local groups (3–81), wherein the plural read transducing elements are physically situated on the periphery of the scanner in N number of local moveable groups (3–83$_1$, 3–83$_2$), and wherein M<N. Each of the moveable groups has a separate actuator (89) for adjusting position of the group.

20 Claims, 5 Drawing Sheets

NON-SYMMETRIC HELICAL SCANNER ARCHITECTURE FOR HIGH TRACK DENSITY

This application claims the priority and benefit of and is related to U.S. Patent Provisional Application Serial No. 60/251,578, filed Dec. 7, 2000, entitled "NON-SYMMETRIC HELICAL SCANNER ARCHITECTURE FOR HIGH TRACK DENSITY".

BACKGROUND

1. Field of the Invention

The present invention pertains to the transducing (e.g., recording and reproduction) of information on/from magnetic tape, and particular to a structure of a scanner (e.g., drum or rotor) for a helical scan tape drive.

2. Related Art and other Considerations

In magnetic recording on tape using a magnetic tape drive, relative motion between a scanner [typically a drum or rotor with both one or more write element(s) and one or more read element(s)] and the tape causes a plurality of tracks of information to be transduced with respect to the tape. The magnetic tape is typically housed in a cartridge which is loaded into the tape drive. The tape extends between a cartridge supply reel and a cartridge take-up reel. The tape drive typically has a supply reel motor for rotating the cartridge supply reel and a take-up reel motor for rotating the cartridge take-up reel.

After the cartridge is loaded into the tape drive, the tape is extracted by mechanisms in the drive so that a segment of the tape is pulled from the cartridge and into a tape path that travels proximate the scanner. The extraction mechanisms take the form of tape guides which are mounted on trolleys. During the extraction operation, trolley motors move the trolleys along a predefined trolley path, so that the tape guides which surmount the trolleys displace the tape into the tape path as the trolleys travel along the trolley path. When the trolleys reach the full extent of travel along the trolley path, the tape is proximate the scanner. Thereafter the tape can be transported past the scanner, e.g., by activation of a capstan and/or the supply reel and take-up reel motors, depending upon the particular type of transport mechanisms employed.

In a helical scan arrangement, as the magnetic tape is transported the magnetic tape is at least partially wrapped around the rotating scanner so that heads (both write heads and read heads) positioned on the scanner are contiguous to the scanner as the scanner is rotated. One or more write heads on the scanner physically record data on the tape in a series of discrete tracks of stripes oriented at an angle with respect to the direction of tape travel. As the tape is transported past the scanner, information can be transduced to or from the tape by the tape drive in recording and reading operations, respectively. The data is formatted, prior to recording on the tape, to provide sufficient referencing information to enable later recovery during readout by one or more read heads. Examples of helical scan tape drives are shown, inter alia, in the following U.S. patents (all of which are incorporated herein by reference): U.S. Pat. No. 4,835,628 to Hinz et al.; U.S. Pat. No. 4,843,495 to Georgis et al.; U.S. Pat. No. 5,065,261 to Hughes et al.; U.S. Pat. No. 5,068,757 to Hughes et al.; U.S. Pat. No. 5,142,422 to Zook et al.; and U.S. Pat. No. 5,602,694 to Miles et al. (which discloses a capstanless helical scan tape drive).

Virtually all multi-headed (i.e., more than 4 magnetic write and/or read heads) helical scanners have the write and read heads themselves "grouped" in logical and often "symmetric" ways. This helps to minimize the number of support structures required. FIG. 1 shows an example of a D-2 Video helical scanner configuration with a total of four write heads in two pairs mounted 180 apart and a total of four read heads in two pairs also mounted 180 apart and shifted 90 from the write heads. Each pair of write heads is mounted on a fixed support structure, and each pair of read heads is mounted on an independently moveable actuator.

It has also been found that at high track density it is beneficial to cluster all the write heads of a helical scanner into one single localized group so that the subtle dynamic effects from mechanical part tolerances, assembly tolerance, bearing tolerances/imperfections, etc. affect all write heads (and their written tracks) quasi-equally (see, for example, Section 6, FIG. 12 of "A High Density Recording Technology for Digital VCRs", *Consumer Electronics*, Vol. 36, No. 3, August 1990). In a similar vein, a particular helical scanner configuration is shown in FIG. 2 shows a scanner configuration in which all of the write heads are clustered into a single localized group and all of the read heads are clustered into a single localized group. In the FIG. 2 configuration, the clustering of all of the write heads into a single localized group has the effect of minimizing the number of support structures is minimized, and all of the written tracks are affected quasi-equally by the subtle dynamic effects. Moreover, the FIG. 2 configuration's clustering of all of the read heads into a single localized group reduces the number of support structures (i.e., actuators) to only one.

However, mounting all of the read heads onto a single actuator reduces the amount of allowable actuator positioning error that can be tolerated while still keeping all four read heads simultaneously within the boundaries of the written tracks that they are reading.

What is needed therefore, and an object of the present invention, is a scanner (e.g., drum or rotor) having a configuration having of heads which, for a given track density, allows greater allowable actuator positioning errors and/or a larger head positioning error tolerances.

BRIEF SUMMARY OF THE INVENTION

A scanner for use in a helical scan magnetic transducing apparatus has a periphery upon which plural read tranducing elements and plural write transducing elements are mounted non-symmetrically. The plural write transducing elements are physically situated on the periphery of the scanner in M number of local groups, wherein the plural read transducing elements are physically situated on the periphery of the scanner in N number of local moveable groups, and wherein M<N. Each of the moveable groups has a separate actuator for adjusting position of the group. Various configurations of scanners with differing M and N parameters are disclosed and within the ambit of the invention.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 3:
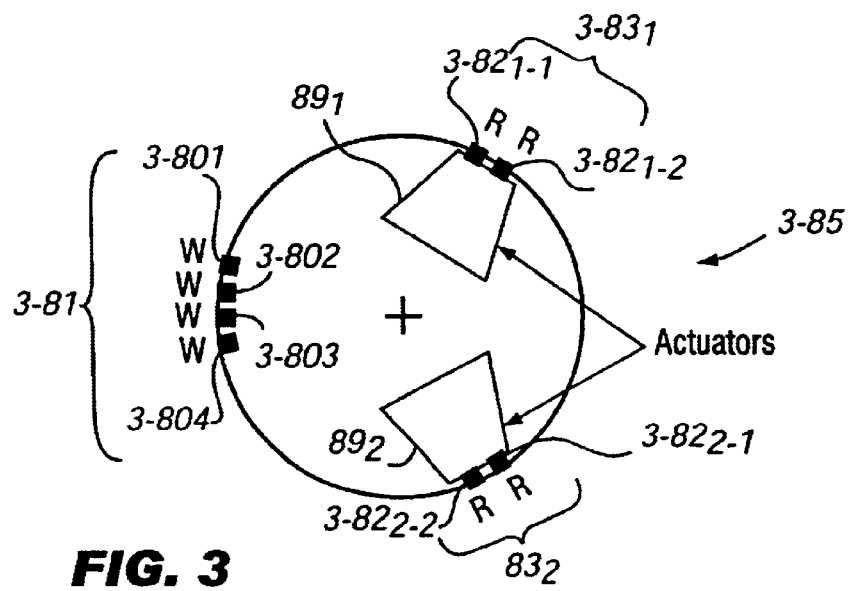
FIG. 3 is a diagrammatic top view of an example scanner configuration according to a first embodiment of the present invention.

FIG. 3 shows a first example, non-limiting embodiment of a scanner configuration according to the present invention. Scanner 3–85 has a non-symmetric configuration of tranducing elements mounted on its periphery (e.g., on its cyclindrical circumferentail or peripheral surface. By "transducing elements" is meant any device or apparatus appropriate for recording information on magnetic tape or reproducing information recorded on magnetic tape, such devices including read heads and write heads, for example. For brevity, the terminology "write heads" and "read heads" shall hereinafter be utilized, but all such references shall be construed to encompass more generic structures that accomplish the same functions.

In the scanner configuration of FIG. 3, write heads $3-80_1$, through $3-80_4$ are clustered into a localized write head group $3-81$. By contrast, the read heads $3-82_{1-1}$, $3-82_{1-2}$, $3-82_{2-1}$, and $3-82_{2-2}$ are split into two pairs or groups, particularly read head group $83_1$ and read head group $83_2$. Each of read head group $83_1$ and read head group $83_2$ is mounted on its own independently moveable actuator. In particular, read head group $83_1$ is mounted on head actuator $89_1$, while read head group $83_2$ is mounted on head actuator $89_2$. As explained below, the ability afforded by having separate actuators (such as head actuator $89_1$ and head actuator $89_2$) enables the two pairs or groups of read heads to be moved relative to each other, which in turn can be utilized to optimize the positions of the read heads relative to the written tracks.

Figure 4:
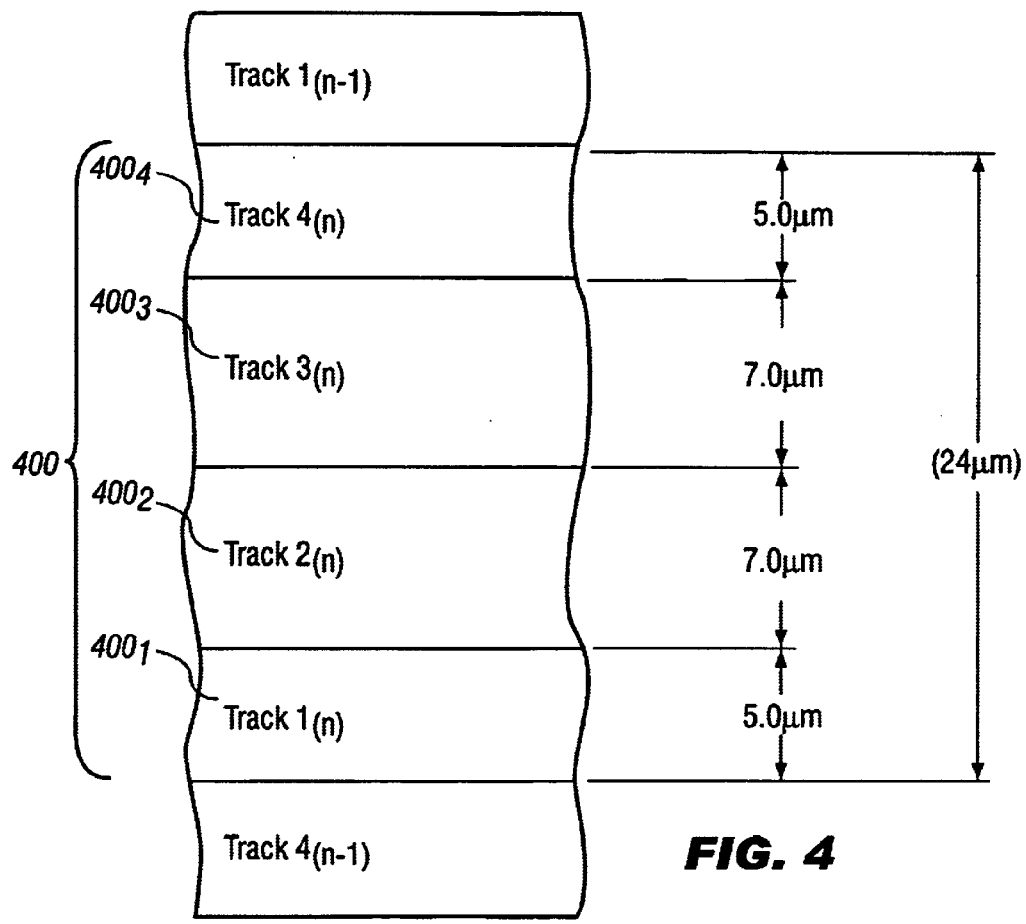
FIG. 4 is a diagrammatic view of a track pattern transduced by a helical scan recorder.

FIG. 4 shows an example typical section of a high track density pattern transduced by a helical scan recorder. In fact, the track pattern of FIG. 4 can be recorded/reproduced by either the scanner configuration of FIG. 2 or the scanner configuration of FIG. 3. Basically, FIG. 4 shows several sets of tracks, including a first set of tracks 400 recorded by a first write head group. The first set of tracks 400 comprises tracks $400_1$–$400_4$, also labeled as Track $1_{(n)}$-Track $4_{(n)}$ (e.g., the tracks in FIG. 4 having the term (n) in the subscript. Tracks written by other write head group(s) have either (n+1) or (n−1) terms in their subscripts). FIG. 4 thus shows an example typical section of a high track density pattern written by either scanner of FIG. 2 or FIG. 3. For the pattern of FIG. 4, the nominal individual written track pitch is 6 $\mu$m with an allowable tolerance of ±1.5 $\mu$m for each track.

Figure 1:
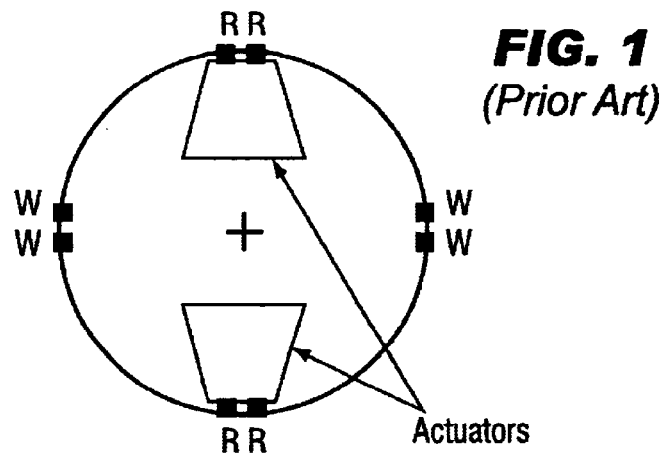
FIG. 1 is a diagrammatic top view of a prior art scanner configuration.
Figure 2:
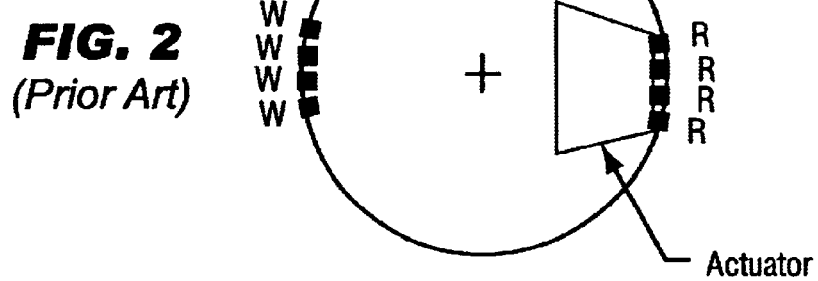
FIG. 2 is a diagrammatic top view of a scanner configuration having all write heads clustered into a single write head group and all read heads cluster into a single read head group.
Figure 5:
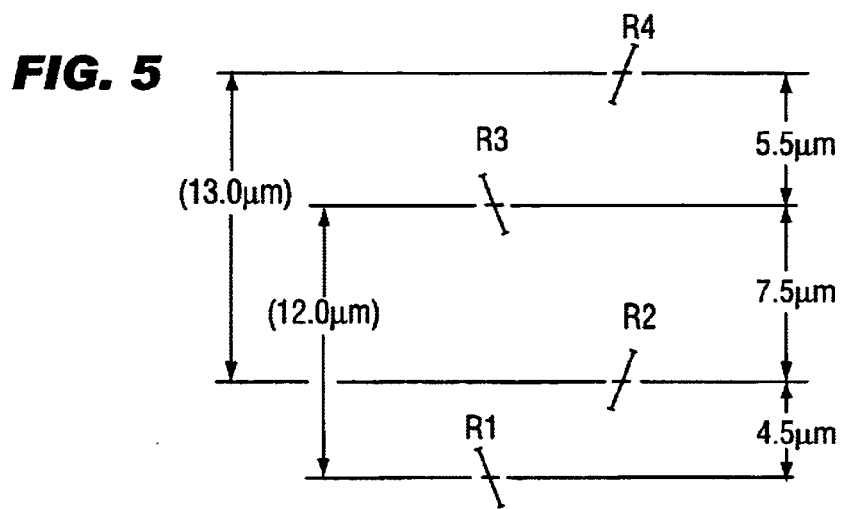
FIG. 5 is a schematic view depicting a pattern of heads for the scanner configuration of FIG. 2.

FIG. 5 shows an example of a typical corresponding read head pattern for the scanner configuration of FIG. 2. Each read head R1–R4 is 2.5 $\mu$m wide and the spacing between adjacent read heads is 6 $\mu$m nominal ±1.5 $\mu$m.

Figure 6:
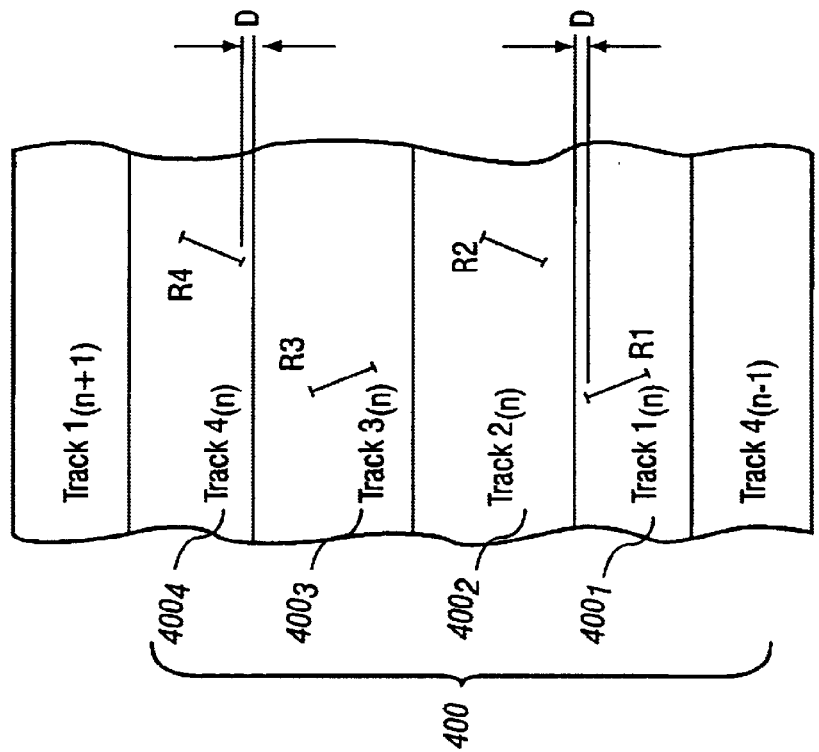
FIG. 6 is a schematic view depicting a pattern of heads for the scanner configuration of FIG. 2 superimposed on the track pattern of FIG. 4.

FIG. 6 shows the read head pattern of FIG. 5 with its read heads R1–R4 (positioned in accordance with the scanner configuration of FIG. 2) superimposed in the best possible position over the written track pattern of FIG. 4. If read heads R1 and R4 are displaced from the best position any more than a distance D, the read heads R1 and R4 will no longer remain totally within the boundaries of the desired written tracks. The distance D for the scanner configuration of FIG. 2 is only ±0.5 $\mu$m, so that it can be said for the FIG. 2 scanner configuration that any read head actuator position error must be limited to ±0.5 $\mu$m in order to ensure that all of the read heads remain within the boundaries of the desired written tracks.

Figure 7:
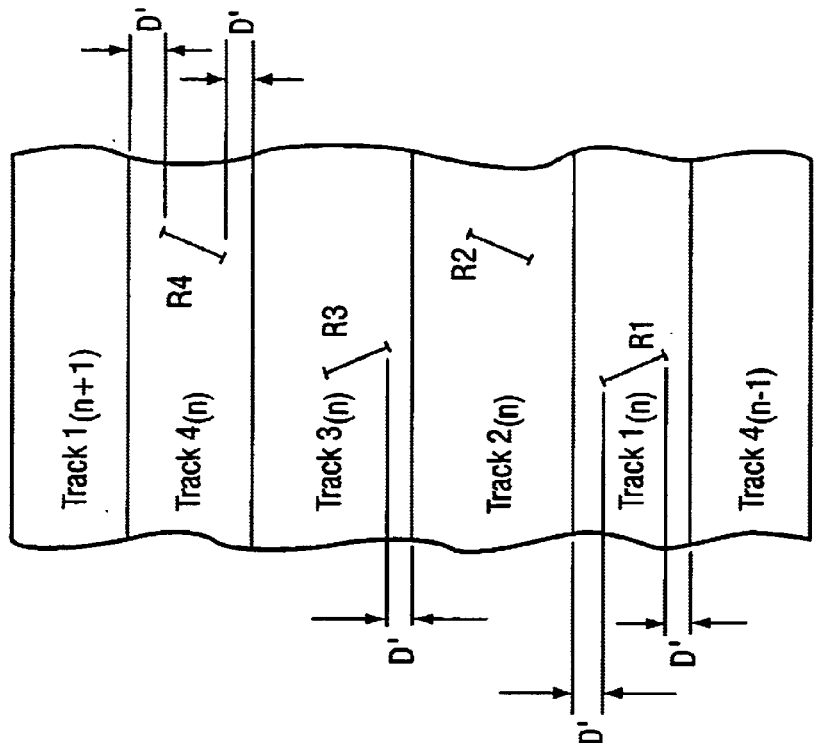
FIG. 7 is a schematic view depicting a pattern of heads for the scanner configuration of FIG. 3 superimposed on the track pattern of FIG. 4.

The inventive scanner configuration of FIG. 3 provides a larger permissible read head actuator position error. In this regard, FIG. 7 shows the same read head pattern of FIG. 5 superimposed in the best possible position over the written track pattern of FIG. 4, except that the R1 and R3 heads are on one actuator (e.g., actuator $89_1$) and the R2 and R4 heads are on a separate actuator (e.g., actuator $89_2$) in accordance with the scanner configuration of FIG. 3. The (fixed) distance between the R1 and R3 head is still 12.0 $\mu$m, and the (fixed) distance between the R2 and R4 head is still 13.0 $\mu$m as before. But since the R1/R3 heads can be moved relative to the R2/R4 heads, the allowable read head actuator position errors are increased to D'. For the FIG. 3 scanner configuration, D'=±1.25 $\mu$m. Thus, FIG. 7 in contrast to FIG. 6 shows that the FIG. 3 scanner configuration provides greater potential read head actuator position error than the FIG. 2 scanner configuration with its fixed array of four read heads.

Figure 8:
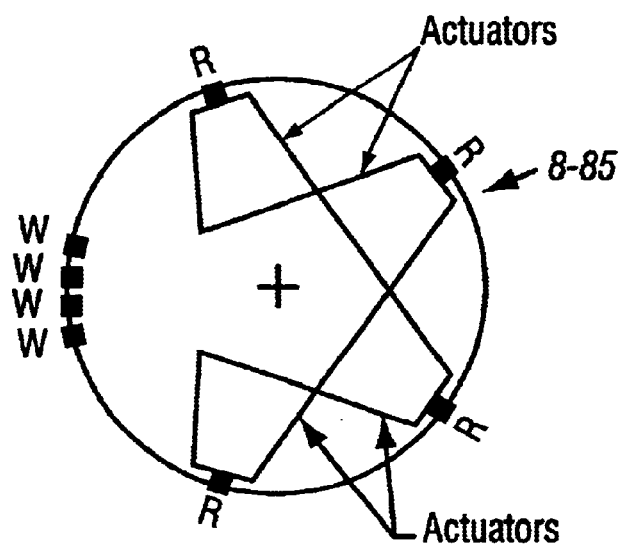
FIG. 8 is a diagrammatic top view of an example scanner configuration according to another embodiment of the present invention.
Figure 9:
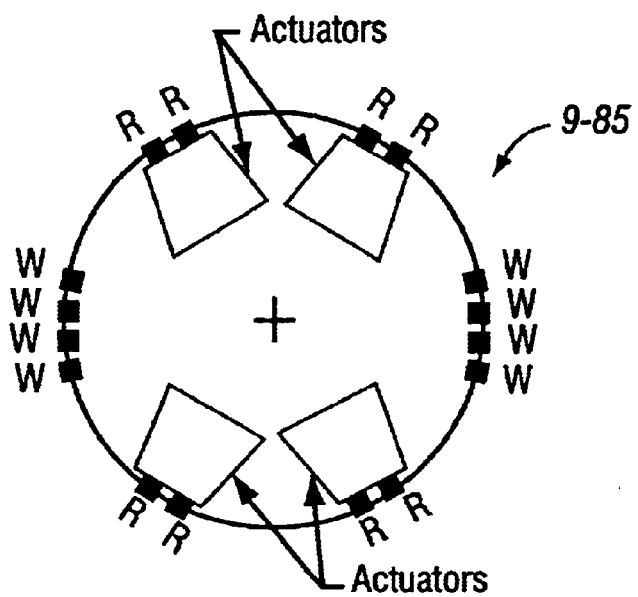
FIG. 9 is a diagrammatic top view of an example scanner configuration according to yet another embodiment of the present invention.

The present invention is not limited to the particular scanner configuration structure shown in FIG. 3. Rather, the invention applies to any helical scanner where the individual write head structures are grouped into "M" local fixed groups and the individual read head structures are grouped into "N" local moveable groups such that m<n. It so happens that in the FIG. 3 scanner orientation that M=1 and N=2. FIG. 8 shows another scanner configuration (scanner 8–85) according to the present invention in which M=1 and N=4, there being one read head for each of the N number of read head groups. Similarly, FIG. 9 shows yet another scanner configuration (scanner 9–85) according to the present invention in which M=2 and N=4, there being two read heads for each of the N number of read head groups.

Thus, the present invention advantageously provides a new "non-symmetric" configuration for the write and read heads of a helical scanner that, for a given track density, allows greater allowable actuator positioning errors and/or a larger head positioning error tolerances. The ability to move separately each group of read heads relative to each other can be used to better optimize their positions relative to the written tracks.

Figure 10:
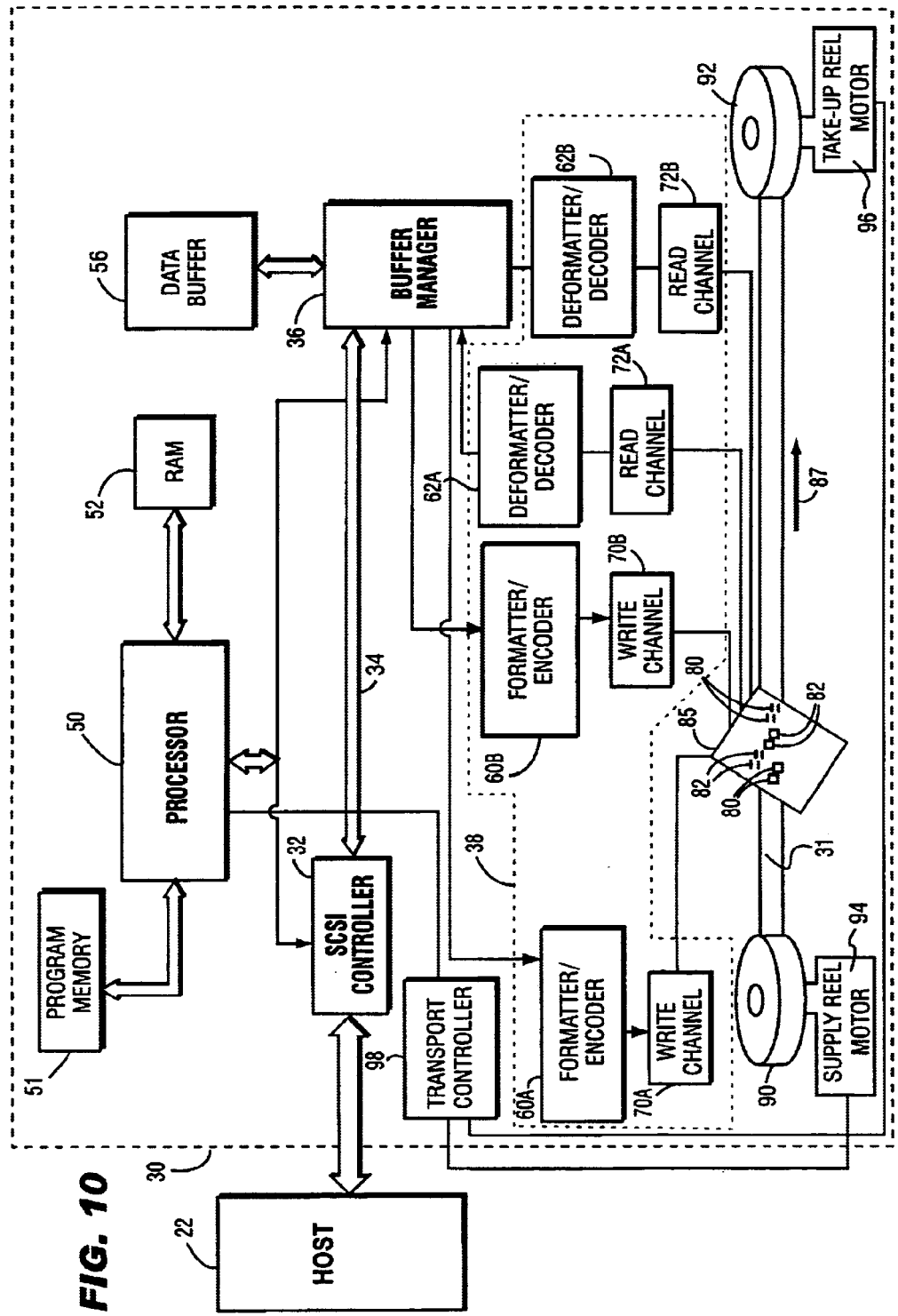
FIG. 10 is a schematic view of an example, representative tape drive in which the scanner configurations of the present invention can be deployed.

FIG. 10 illustrates an example, non-limiting, representative tape drive in which embodiments of the scanner configurations of the present invention can be deployed. FIG. 10 shows a SCSI bus 20 which connects a host computer 22 and a first embodiment of a SCSI target storage device, particularly tape drive 30. In the illustrated embodiment, an example tape drive 30 is shown as a generic helical scan tape drive which transduces information on/from tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Processor 50 is also connected to program memory 51 and to a data memory, particularly RAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to synchronization detection system 38. The synchronization detection system 38 is connected to one or more recording element(s) or write head(s) 80 and to one or more read element(s) or read head(s) 82.

The write head(s) 80 and the read head(s) 82 are mounted on a peripheral surface of scanner 85, e.g., a rotatable drum or rotor. Tape 31 is wrapped around scanner 85 such that head(s) 80 and 82 follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around scanner 85.

A supply reel 90 and take-up reel 92 are driven by respective reel motors 94 and 96 to transport tape 31 in the direction 87. Reel motors 94 and 96 are driven by transport controller 98, which ultimately is governed by processor 50. Operation and control of the tape transport mechanism of this second type of tape drive including reel motors 94 and 96 is understood by the person skilled in the art with reference, for example, to U.S. Pat. No. 5,680,269 and incorporated herein by reference.

In addition to write heads 80 and read heads 82, as further shown in FIG. 2 scanner 85 can also have certain unillustrated electronics mounted thereon. The scanner-mounted electronics are understood with reference to U.S. patent application Ser. No. 09/761,658, filed Jan. 18, 2001, entitled "PHASE BASED TIME DOMAIN TRACKING FOR HELICAL SCAN TAPE DRIVE", and U.S. patent application Ser. No. 09/492,345, filed Jan. 27, 2000, entitled "POWER SUPPLY CIRCUIT AND METHOD OF CALIBRATION THEREFOR", both of which are incorporated herein by reference in their entirety.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A scanner for use in a helical scan magnetic transducing apparatus, the scanner having a periphery upon which plural read tranducing elements and plural write transducing elements are mounted non-symmetrically, a number of the read transducing element equaling a number of the write transducing elements, wherein the plural write transducing elements are physically situated on the periphery of the scanner in M number of local groups, wherein the plural read transducing elements are physically situated on the periphery of the scanner in N number of local moveable groups, and wherein M<N, the read transducing elements are mounted on multiple moveable actuators for optimizing positions of the read transducing elements relative to helical tracks.

2. The apparatus of claim 1, wherein M=1 and N=4.

3. The apparatus of claim 1, wherein each of the M number of groups of write transducing elements has a position physically fixed on the periphery of the scanner.

4. A scanner for use in a helical scan magnetic transducing apparatus, the scanner having a periphery upon which plural read tranducing elements and plural write transducing elements are mounted non-symmetrically, wherein the plural write transducing elements are physically situated on the periphery of the scanner in M number of local groups, wherein the plural read transducing elements are physically situated on the periphery of the scanner in N number of local moveable groans, and wherein M=1 and N=2.

5. The apparatus of claim 4, wherein each of the N number of groups of read transducing elements consists of two read transducing elements.

6. A scanner for use in a helical scan magnetic transducing apparatus, the scanner having a periphery upon which plural read tranducing elements and plural write transducing elements are mounted non-symmetrically, wherein the plural write transducing elements are physically situated on the periphery of the scanner in M number of local groups, wherein the plural read transducing elements are physically situated on the periphery of the scanner in N number of local moveable groups, wherein M=1 and N=4, wherein each of the N number of groups of read transducing elements consists of one read transducing element.

7. A scanner for use in a helical scan magnetic transducing apparatus, the scanner having a periphery upon which plural read tranducing elements and plural write transducing elements are mounted non-symmetrically, wherein the plural write transducing elements are physically situated on the periphery of the scanner in M number of local groups, wherein the plural read transducing elements are physically situated on the periphery of the scanner in N number of local moveable groups, and wherein M=2 and N=4.

8. The apparatus of claim 7, wherein each of the N number of groups of read transducing elements consists of one two read transducing elements.

9. A scanner for use in a helical scan magnetic transducing apparatus, the scanner having a periphery upon which plural read tranducing elements and plural write transducing elements are mounted non-symmetrically, wherein the plural write transducing elements are physically all situated on the periphery of the scanner in M number of local groups, wherein the plural read transducing elements are physically situated on the periphery of the scanner in N number of local moveable groups, wherein M<N, and wherein each of the moveable groups has a separate actuator for adjusting position of the group.

10. A scanner for use in a helical scan magnetic transducing apparatus, the scanner having a periphery upon which plural read tranducing elements and plural write transducing elements are mounted non-symmetrically, wherein the plural write transducing elements are physically situated on the periphery of the scanner in M number of local groups, wherein the plural read transducing elements are physically situated on the periphery of the scanner in N number of local moveable groups, and wherein each of the M number of groups of write transducing elements consists of one four write transducing elements.

11. A helical scan recording system comprising:

a scanner having a periphery upon which plural read tranducing elements and plural write transducing elements are mounted non-symmetrically, a number of the read transducing elements equaling a number of the write transducing elements;

a tape transport for transporting the magnetic tape proximate the scanner;

a data buffer which stores user data, the user data being either for recording on the tape using the plural read transducing elements or reproduced from the tape using the plural write transducing elements;

a formatter which formats user data for recording on the tape;

a deformatter which deformats user data reproduced from the tape wherein the plural write transducing elements are physically situated on the periphery of the scanner in M number of local groups, wherein the plural read transducing elements are physically situated on the periphery of the scanner in N number of local moveable groups, and wherein M<N, wherein the read transducing elements are mounted on multiple moveable actuators for optimizing positions of the read transducing elements relative to helical tracks.

12. The apparatus of claim 11, wherein M=1 and N=4.

13. The apparatus of claim 11, wherein each of the M number of groups of write transducing elements has a position physically fixed on the periphery of the scanner.

14. A helical scan recording system comprising:

a scanner having a periphery upon which plural read tranducing elements and plural write transducing elements are mounted non-symmetrically, a tape transport for transporting the magnetic tape proximate the scanner a data buffer which stores user data, the user data being either for recording on the tape using the plural read transducing elements or reproduced from the tape using the plural write transducing elements;

a formatter which formats user data for recording on the tape;

a deformatter which deformats user data reproduced from the tape wherein the plural write transducing elements are physically situated on the periphery of the scanner in M number of local groups, wherein the plural read transducing elements are physically situated on the periphery of the scanner in N number of local moveable groups, and wherein M=1 and N=2.

15. The apparatus of claim 14, wherein each of the N number of groups of read transducing elements consists of two read transducing elements.

16. A helical scan recording system comprising:

a scanner having a periphery upon which plural read tranducing elements and plural write transducing elements are mounted non-symmetrically;

a tape transport for transporting the magnetic tape proximate the scanner;

a data buffer which stores user data, the user data being either for recording on the tape using the plural read transducing elements or reproduced from the tape using the plural write transducing elements;

a formatter which formats user data for recording on the tape;

a deformatter which deformats user data reproduced from the tape wherein the plural write transducing element are physically situated on the periphery of the scanner in M number of local groups, wherein the plural read transducing elements are physically situated on the periphery of the scanner in N number of local moveable groups, wherein M<N, and wherein each of the N number of groups of read transducing elements consists of one read transducing element.

17. A helical scan recording system comprising:

a scanner having on which plural read transducing elements and plural write transducing elements are mounted non-symmetrically;

a tape transport for transporting the magnetic tape proximate the scanner;

a data buffer which stores user data, the user data being either for recording on the tape using the plural read transducing elements or reproduced from the plural write transducing elements;

a formatter which formats user data for recording on the tape;

a deformatter which deformats user data reproduced from the tape wherein the plural write transducing elements are physically situated on the periphery of the scanner in M number of local groups, wherein the plural read transducing elements are physically situated on the periphery of the scanner in N number of local moveable groups, and wherein M=2 and N=4.

18. The apparatus of claim 17, wherein each of the N number of groups of read transducing elements consists of one two read transducing elements.

19. A helical scan recording system comprising:

a scanner having a periphery upon which plural read transducing elements and plural write transducing elements are mounted non-symmetrically;

a tape transport for transporting the magnetic tape proximate the scanner;

a data buffer which stores user data, the user data being either for recording on the tape using the plural read transducing elements or reproduced from the tape using the plural write transducing elements;

a formatter which formats user data for recording on the tape;

a deformatter which deformats user data reproduced from the tape wherein the plural write transducing elements are physically situated on the periphery of are physically situated on the periphery of the scanner in N number of local moveable groups, wherein M<N, and wherein each of the moveable groups has a separate actuator for adjusting position of the group.

20. A helical scan recording system comprising:

a scanner having a periphery upon which plural read transducing elements and plural write transducing elements are mounted non-symmetrically;

a tape transport for transporting the magnetic tape proximate the scanner;

a data buffer which stores user data the user data being either for recording on the tape using the plural read transducing elements or reproduced from the tape using the plural write transducing elements;

a formatter which formats user data for recording on the tape;

a deformatter which deformats user data reproduced from the tape wherein the plural write transducing element are physically situated on the periphery of the scanner in M number of local groups, wherein the plural read transducing elements are physically situated on the periphery of the scanner in N number of local moveable groups, wherein M<N, and wherein each of the M number of groups of write transducing elements consists of one four write transducing elements.

* * * * *